United States Patent
Cho

(10) Patent No.: US 7,224,402 B2
(45) Date of Patent: May 29, 2007

(54) APPARATUS FOR PROCESSING IMAGE SIGNAL AND METHOD THEREOF

(75) Inventor: Sung-hun Cho, Busan (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 491 days.

(21) Appl. No.: 10/235,793

(22) Filed: Sep. 6, 2002

(65) Prior Publication Data

US 2003/0076446 A1    Apr. 24, 2003

(30) Foreign Application Priority Data

Oct. 24, 2001    (KR) ............................. 2001-65597

(51) Int. Cl.
*H04N 5/46*    (2006.01)
(52) U.S. Cl. .................. 348/558; 348/706; 348/441; 348/625; 710/16
(58) Field of Classification Search .............. 348/558, 348/554, 556, 555, 441, 458, 625, 705, 706; 710/16, 62, 18
See application file for complete search history.

(56) References Cited

U.S. PATENT DOCUMENTS

| | | | | |
|---|---|---|---|---|
| 5,218,436 A | * | 6/1993 | Sugiyama et al. | 348/445 |
| 5,585,856 A | * | 12/1996 | Nakaya et al. | 348/441 |
| 5,636,290 A | * | 6/1997 | Kita et al. | 382/167 |
| 5,668,890 A | * | 9/1997 | Winkelman | 382/167 |
| 5,703,657 A | * | 12/1997 | Maruoka et al. | 348/554 |
| 5,861,924 A | * | 1/1999 | Pan et al. | 348/451 |
| 5,872,999 A | * | 2/1999 | Koizumi et al. | 710/72 |
| 5,914,753 A | * | 6/1999 | Donovan | 348/441 |
| 5,923,384 A | * | 7/1999 | Enomoto et al. | 348/705 |
| 5,943,097 A | * | 8/1999 | Horii | 348/441 |
| 6,094,226 A | * | 7/2000 | Ke et al. | 348/446 |
| 6,144,412 A | * | 11/2000 | Hirano et al. | 348/441 |
| 6,178,272 B1 | * | 1/2001 | Segman | 382/298 |
| 6,189,050 B1 | * | 2/2001 | Sakarda | 710/18 |
| 6,256,068 B1 | * | 7/2001 | Takada et al. | 348/441 |
| 6,268,939 B1 | * | 7/2001 | Klassen et al. | 358/518 |
| 6,310,659 B1 | * | 10/2001 | Glen | 348/589 |
| 6,321,340 B1 | * | 11/2001 | Shin et al. | 713/310 |
| 6,323,905 B1 | * | 11/2001 | Kondo et al. | 348/441 |

(Continued)

FOREIGN PATENT DOCUMENTS

JP        2001008115 A    *    1/2001

Primary Examiner—Victor R. Kostak
(74) Attorney, Agent, or Firm—Sughrue Mion, PLLC

(57) ABSTRACT

An image signal processing apparatus and method is capable of variably performing format conversion and image quality improvement according to a kind of an inputted image signal. A detecting section detects a kind of image signal inputted from an external device. A control section controls the format of the image signal to be converted by selecting the format converting coefficient from the first storing section in accordance with the kind of the image signal. A format converting section converts a format of the inputted video signal by the selected format converting coefficient. The control section selects an image quality improving converting coefficient corresponding to the video signal from the second storing section. The image quality improving section improves a quality of the video signal converted by the selected image quality improving converting coefficient. By varying the format converting coefficient and image quality improving converting coefficient according to the kind of the image signal, it is possible to perform the format conversion and image quality improvement suitable for the kind of the inputted image signal.

4 Claims, 5 Drawing Sheets

U.S. PATENT DOCUMENTS

| | | | |
|---|---|---|---|
| 6,441,870 B1 * | 8/2002 | Rapaich | 348/674 |
| 6,453,364 B1 * | 9/2002 | Hara | 710/16 |
| 6,490,009 B1 * | 12/2002 | Asakura | 348/705 |
| 6,556,219 B1 * | 4/2003 | Wugofski | 715/762 |
| 6,594,707 B1 * | 7/2003 | Rubinstein et al. | 709/250 |
| 6,654,840 B1 * | 11/2003 | Gendo et al. | 710/300 |
| 6,657,646 B2 * | 12/2003 | Partridge et al. | 715/835 |
| 6,747,640 B2 * | 6/2004 | Okuno et al. | 345/213 |
| 6,801,957 B1 * | 10/2004 | Sadanaka et al. | 710/16 |
| 6,806,911 B2 * | 10/2004 | Takemoto | 348/554 |
| 6,819,305 B2 * | 11/2004 | Wicker | 345/3.1 |
| 7,047,325 B2 * | 5/2006 | Kondo et al. | 710/16 |
| 2002/0024613 A1 * | 2/2002 | Ross et al. | 348/445 |

\* cited by examiner

APPARATUS FOR PROCESSING IMAGE SIGNAL AND METHOD THEREOF

BACKGROUND OF THE INVENTION

1. Field of the Invention

The present invention relates to an apparatus for processing an image signal, and more particularly, to an image signal processing apparatus and method capable of easily performing format conversion and image quality improvement of an image signal inputted from an external device. The present application is based on Korean Patent Application No. 2001-65597, filed Oct. 24, 2001, which is incorporated herein by reference.

2. Description of the Related Art

A television set (TV) is a typical apparatus for displaying an image signal. The typical TV outputs images, by use of a Braun tube (cathode ray tube). Such a TV using a cathode ray tube has drawbacks of high power consumption and large volume. Accordingly, the above drawbacks brought about the use of a liquid crystal TV using a LCD, a plasma TV using a plasma display, or the like. A liquid crystal or plasma TV is an improvement of the conventional Braun tube in an attempt to solve the drawbacks of the conventional Braun tube, such as high power consumption and large volume. Because of the high price of the liquid crystal or plasma TV, however, Braun tubes are widely used at the present.

In the development of a new display appliance, there also have been many efforts to increase the width of the display device. As a broadcasting station transmits a broadcasting signal of a constant size, a technique of format-converting the constant size of the broadcasting signal into a signal having a size suitable for the widened screen is required.

In addition, in accordance with the increased use of personal computers, recently, it is also demanded that an output screen of the computer is displayed on a home TV or LCD monitor. In this case, since a scanning line of the LCD monitor or TV is not identical with that of the personal computer, it is impossible to output various kinds of video formats (SVGA, XGA and VGA) inputted from the personal computer on the TV or LCD monitor as they are. Accordingly, the various kinds of image signals to be inputted must be format-converted appropriately for the display appliance.

FIG. 1 is a block diagram perspectively illustrating an image signal processing apparatus of the prior art. The apparatus comprises a format converting section 100 for converting a format of an image signal inputted from an external device, such as a TV broadcasting signal, a video signal, a DVD signal or the like, into a format corresponding to the size of a TV screen, and an image quality improving section 110 for improving the image signal outputted from the format converting section 100 by use of an algorithm such as noise reduction, profile emphasize, contrast enhancement or the like.

According to the prior art apparatus, a plurality of image signals inputted to the format converting section 100 are regarded as a broadcasting signal generally received by the TV, and resolution, a size of the screen, a frequency of an image and the like are converted to be displayed on the display appliance.

In addition, the prior art apparatus has no consideration for the characteristic of the inputted image signals relative to each image signal such as a video signal, a TV broadcasting signal, a camcorder signal, and a DVD image signal. Accordingly, since the inputted image signal is regarded as the same signal as the TV broadcasting signal, the process of format conversion and quality improvement is implemented by the same method as that of the TV broadcasting signal. Therefore, there is a problem that since all the image signals are processed according to the same pattern, the characteristics of the respective image signal are not maintained.

SUMMARY OF THE INVENTION

It is an object of the present invention to provide an image signal processing apparatus and method capable of variably performing format conversion and image quality improvement according to the kind of the image signal which is input.

The above object is accomplished by an apparatus for processing an image signal according to the present invention, comprising: a detecting section for detecting the kind of the image signal inputted from an external device; a first storing section for storing a plurality of format converting coefficients; a format converting section for converting a format of the image signal by use of the format converting coefficient corresponding to the kind of the image signal; and a control section for transmitting to the format converting section the format converting coefficient selected from the first storing section in accordance with the kind of the image signal, and controlling the format converting section to convert the format of the image signal by using the transmitted format converting coefficient.

The detecting section includes an input section having different input terminals according to the kind of external device; and a signal detecting section for detecting the kind of the image signal by distinguishing the terminal to which the image signal is inputted.

Preferably, further provided are a second storing section for storing a plurality of image quality improving converting coefficients; and an image quality improving section for improving the quality of the image signal by the image quality improving converting coefficient corresponding to the kind of the image signal. The control section, being inputted with the image signal of converted format, transmits to the image quality improving section the image quality improving converting coefficient selected from the second storing section, and controls the image quality improving section to improve the image quality of the image signal by using the transmitted image quality improving converting coefficient.

The above object is also accomplished by a method for processing an image signal according to the present invention, including the steps of: detecting a kind of image signal inputted from an external device; selecting a format converting coefficient corresponding to the kind of the image signal; and converting a format of the image signal by the format converting coefficient. The detecting step detects the kind of the image signal by distinguishing an input terminal to which the image signal is inputted.

Preferably, further provided are the steps of: selecting an image quality improving converting coefficient corresponding to the kind of the image signal; and improving a quality of the image signal by the selected image quality improving converting coefficient.

Meanwhile, an apparatus for processing an image signal according to the present invention includes an input section for receiving the kind of an external device from a user; a first storing section for storing a plurality of format converting coefficients; a format converting section for converting a format of the image signal by use of the format converting coefficient corresponding to the kind of the image signal inputted from the external device; and a control section for transmitting to the format converting section the format converting coefficient selected from the first storing section in accordance with the kind of the image signal, and controlling the format converting section to convert the format of the image signal by using the transmitted format converting coefficient.

Preferably, further provided are a second storing section for storing a plurality of image quality improving converting coefficients; and an image quality improving section for improving the quality of the image signal by the image quality improving converting coefficient corresponding to the image signal inputted from the external device. The control section transmits to the image quality improving section the image quality improving converting coefficient selected from the second storing section in accordance with the external device, and controls to improve the image quality of the converted image signal by using the transmitted image quality improving converting coefficient.

A method of processing an image signal according to the present invention includes the steps of: receiving the kind of an external device from a user; selecting a format converting coefficient corresponding to the kind of the external device; and converting a format of the image signal by the format converting coefficient.

Preferably, further provided are the steps of selecting an image quality improving converting coefficient corresponding to the kind of the external device; and improving a quality of the image signal by the image quality improving converting coefficient.

By pre-storing the format converting coefficient and image quality improving converting coefficient for each kind of the image signal, and selecting the format converting coefficient corresponding to the kind of the image signal, if the image signal is inputted from the external device, the format of the inputted image signal is converted, so that the image quality of the converted image signal can be improved by the image quality improving converting coefficient.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Reference will now be made in detail to the preferred embodiment of the present invention.

Figure 1:
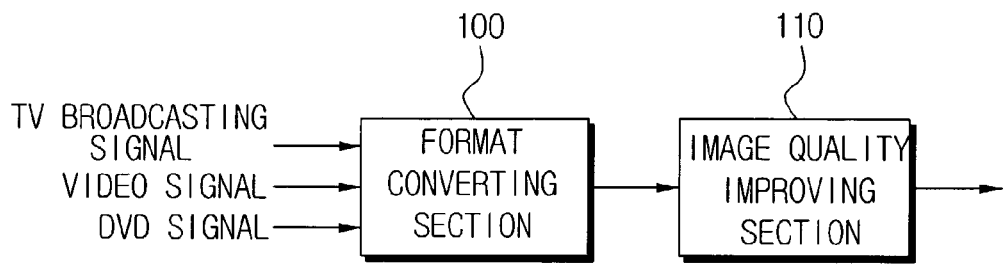
FIG. 1 is a block diagram perspectively illustrating an image signal processing apparatus of the prior art.
Figure 2:
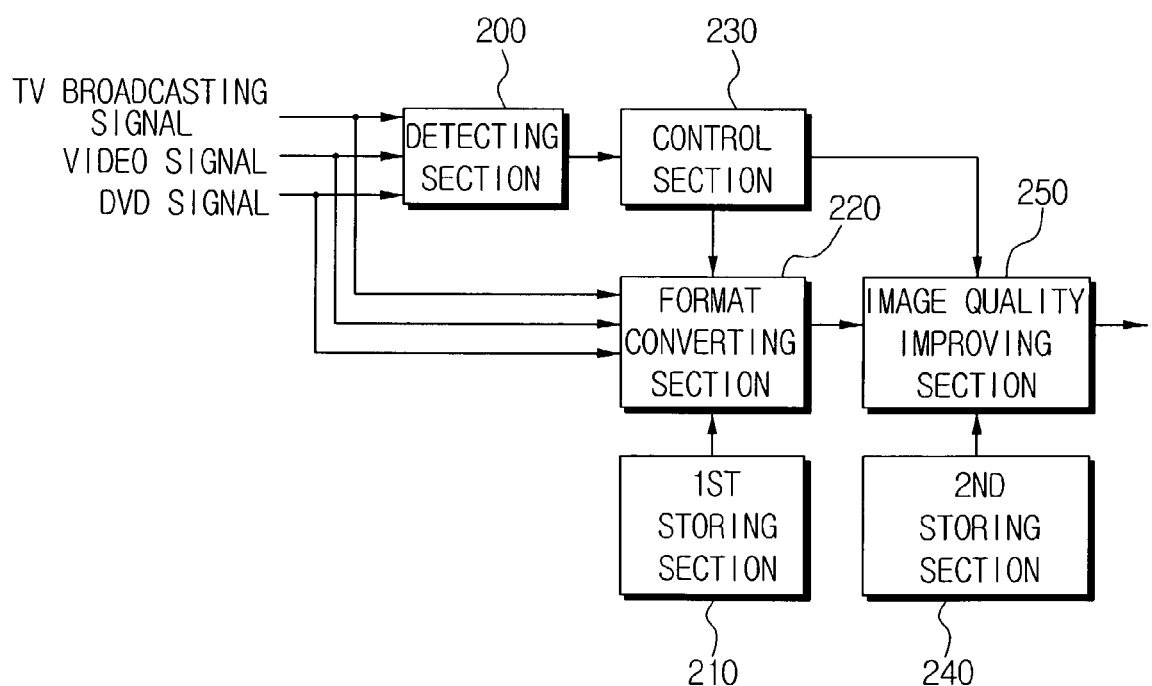
FIG. 2 is a block diagram of an image signal processing apparatus according to one preferred embodiment of the present invention.

FIG. 2 is a block diagram of an image signal processing apparatus according to one preferred embodiment of the present invention.

Referring to FIG. 2, the apparatus comprises a detecting section 200, a first storing section 210, a format converting section 220, a control section 230, a second storing section 240, and an image quality improving section 250.

The detecting section 200 detects a kind of image signal inputted from an external device.

Figure 3:
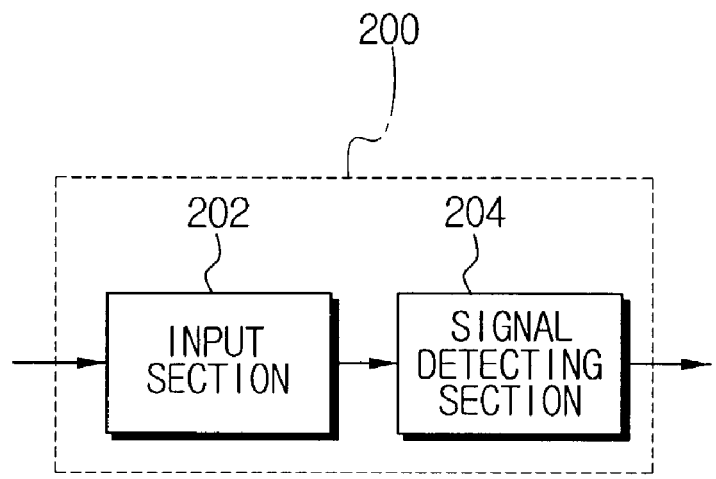
FIG. 3 is a block diagram illustrating the detailed construction of a detecting section of an image signal processing apparatus according to the present invention.

FIG. 3 is a block diagram illustrating the detailed construction of the detecting section. Referring to FIG. 3, the detecting section includes an input section 202 and a signal detecting section 204. The input section 202 consists of input terminals respectively formed for each kind of external device. The image signal is outputted from an image output terminal of each external device (e.g., camcorder, VCR or the like), and is inputted to a terminal corresponding to each external device. The signal detecting section 204 distinguishes the terminal to which the image signal is inputted, to thereby detect the kind of the image signal. The signal detecting section 204 also detects a current or voltage variation of each terminal to distinguish the terminal to which the image signal is inputted. With the process described above, the kind of the image signal is determined.

Figure 4:
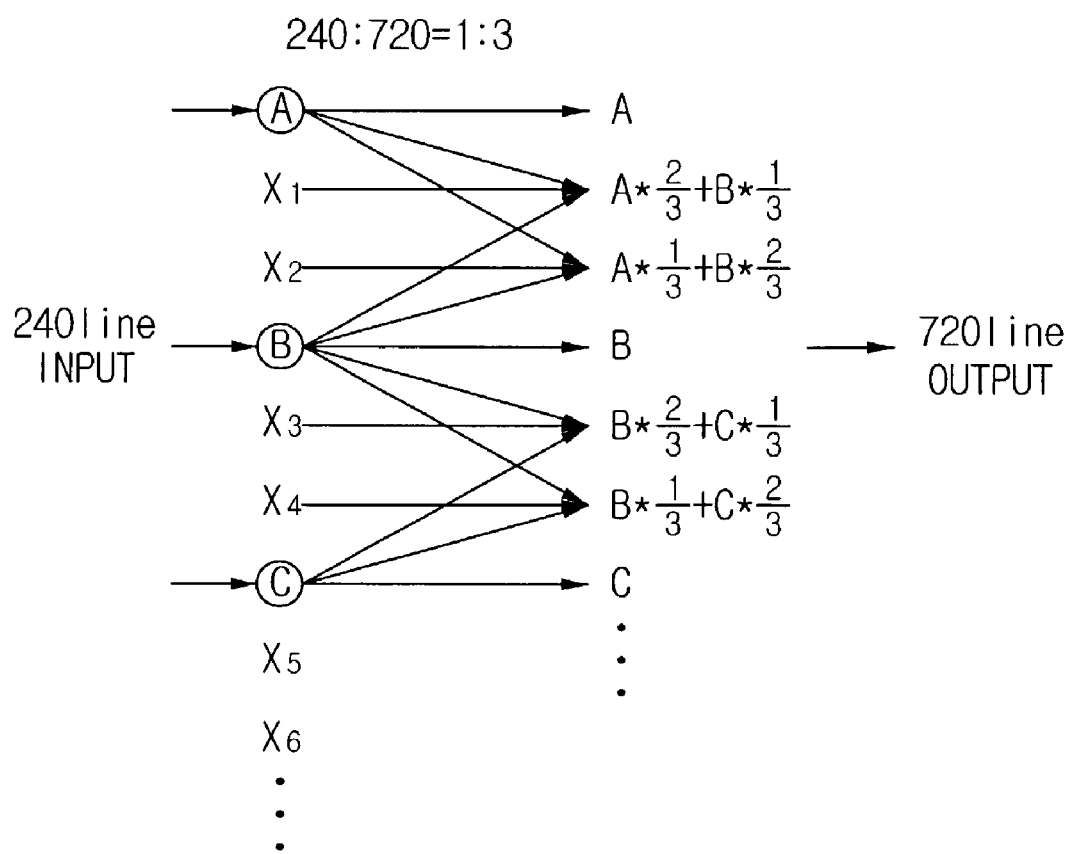
FIG. 4 is a view showing a method of controlling a format converting coefficient of an image signal processing apparatus according to the present invention.

The first storing section 210 stores a plurality of format converting coefficients. The format converting section 220 converts a format of the image signal by use of the format converting coefficient corresponding to the kind of the image signal detected by the detecting section 200. The control section 230 transmits to the format converting section 220 the format converting coefficient selected from the first storing section 210 in accordance with the kind of the image signal, and controls the format converting section 220 to convert the format of the image signal by using the transmitted format converting coefficient. FIG. 4 is a view showing an example of the format converting coefficient according to the format conversion of the image signal processing apparatus according to the present invention. Referring to FIG. 4, in order to output a format of an image signal inputted in 240 lines on a screen having 720 lines, the input image has to be magnified and displayed in a size three times larger. Accordingly, a method of magnifying and displaying the inputted image signal to the size three times larger is as follows. In case of a TV broadcasting signal, the format converting coefficient corresponding to 'X1' is 'A×⅔+B×⅓'. Since 'X1' is a signal closer to 'A' than 'B', the format converting coefficient places more weight on 'A'. On the other hand, since 'X2' is a signal closer to 'B' than 'A', the format converting coefficient is 'A×⅓+B×⅔' which places more weight on 'B' than on 'A'.

With the above method, in the case of a cam corder signal, the format converting coefficient corresponding to 'X1' is 'A×⅗+B×⅖'. Since 'X1' is a signal closer to 'A' than 'B', the format converting coefficient places more weight on 'A' than on 'B'. On the other hand, since 'X2' is a signal closer to 'B' than 'A', the format converting coefficient is 'A×⅖+B×⅗' which places more weight on 'B' than on 'A'. The format converting section 220 can perform format conversion appropriately for each image signal by varying the format converting coefficient according to the kind of the image signal.

The second storing section 240 stores a plurality of image quality improving converting coefficients. The control section 230, being inputted with the image signal in the converted format, transmits to the image quality improving section 250 the image quality improving converting coefficient selected from the second storing section 240, and controls the image quality improving section 250 to improve the image quality of the image signal by using the transmitted image quality improving converting coefficient. The image quality improving section 250 improves the image quality of the image signal by using the image quality improving converting coefficient inputted from the control section 230.

For example, in the case of a TV broadcasting signal, the signal contains a lot of noise. Accordingly, in order to reduce the noise, components of the noise are reduced by use of a noise parameter and a motion parameter. Specifically, in the case of the TV broadcasting signal, the effect of the noise can be reduced to improve the quality of the image by increasing the noise parameter.

Figure 5:
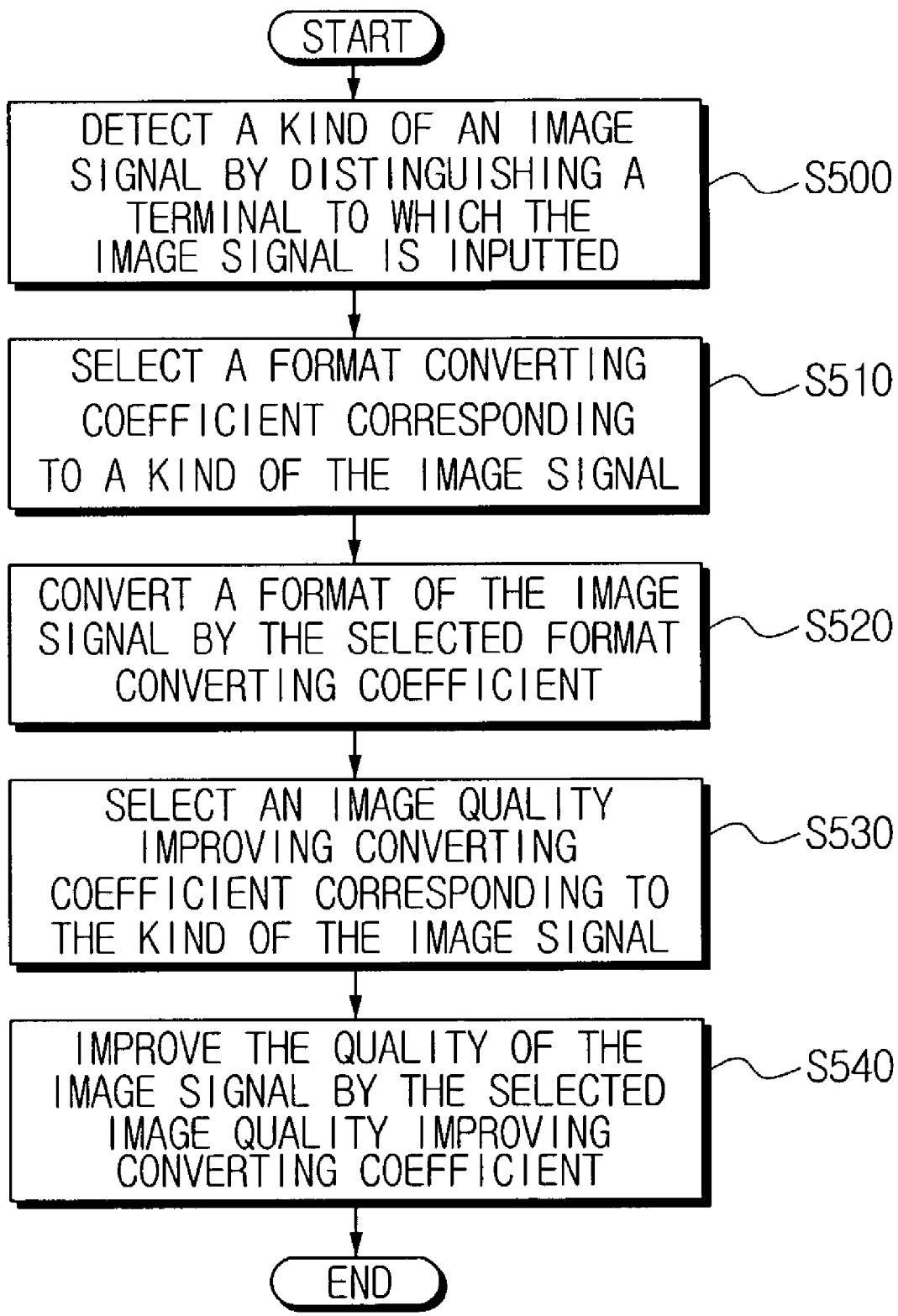
FIG. 5 is a flowchart of an image signal processing method according to one preferred embodiment of the present invention.

In the case of a DVD signal, however, if the noise parameter is increased as in the case of the TV broadcasting signal, there is a problem in that an afterimage may occur during quick action. In the case of a DVD signal having a high quality of image signal, since it is affected little by noise, the phenomenon in which the afterimage remains during quick action can be improved by decreasing the noise parameter relative to that of the TV broadcasting signal and increasing the motion parameter relative to that of the TV broadcasting signal. As described, the image quality improving section 250 can improve the image quality as it variably uses the image quality improving converting coefficient suitably for each kind of image signal under the control of the control section 230. FIG. 5 is a flowchart of an image signal processing method according to one preferred embodiment of the present invention.

Referring to FIG. 5, in a system having input terminals for respectively receiving input signals from different kinds of external devices, the system detects the kind of input image signal by distinguishing the terminal to which the image signal is inputted (step S500). In the case of detecting the kind of the image signal inputted from the external device, the control section 230 selects a format converting coefficient, among a plurality of format converting coefficients stored in the first storing section 210, corresponding to the kind of the image signal inputted from the external device (step S510). The format converting section 220 converts a format of the image signal by the selected format converting coefficient (step S520).

The control section 230 selects an image quality improving converting coefficient corresponding to the kind of the image signal from the second storing section 240 (step S530). If a TV broadcasting signal, for example, is inputted, since there is a lot of noise in the TV broadcasting signal, the image quality improving converting coefficient employs a noise reduction (NR) algorithm. Typically, the NR algorithm reduces the component of the noise by employing a noise parameter and motion parameter. In the case that a TV broadcasting signal is input, the system can reduce an effect of the noise and improve the quality of the image by increasing the noise parameter.

In the case that a high quality image signal such as a DVD signal is input, however, if the NR is increased, there is a problem in that an afterimage occurs caused by quick action. In the case of the DVD signal, since it is affected little by noise, the phenomenon in which the afterimage remains during quick action can be improved by decreasing the noise parameter relative to that of the TV broadcasting signal and increasing the motion parameter relative to that of the TV broadcasting signal. The quality of image can be improved in accordance with the kind of image signal input by regulating the image quality improving converting coefficient.

Although the method of reducing the effect of the noise in improving the quality of the image by regulating the image quality improving converting coefficient has been described in the embodiment of the present invention, the scope of the present invention is not limited thereto. For example, it is also possible to improve the image quality by variably applying the converting coefficients of components which influence the image quality, such as profile emphasis and contrast enhancement using a histogram, in accordance with the kind of image signal.

The image quality improving section 250 improves the image quality of the image signal by the image quality improving converting coefficient that is selected by the control section 230 (step S540).

Figure 6:
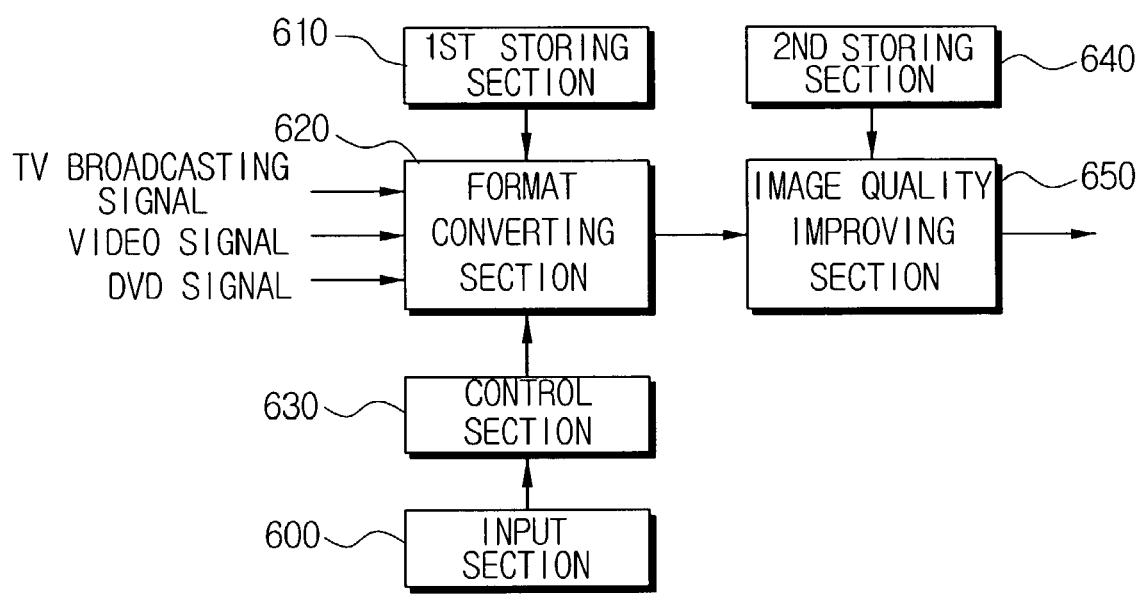
FIG. 6 is a block diagram of an image signal processing apparatus according to another preferred embodiment of the present invention.

FIG. 6 is a block diagram of an image signal processing apparatus according to another preferred embodiment of the present invention.

Figure 7:
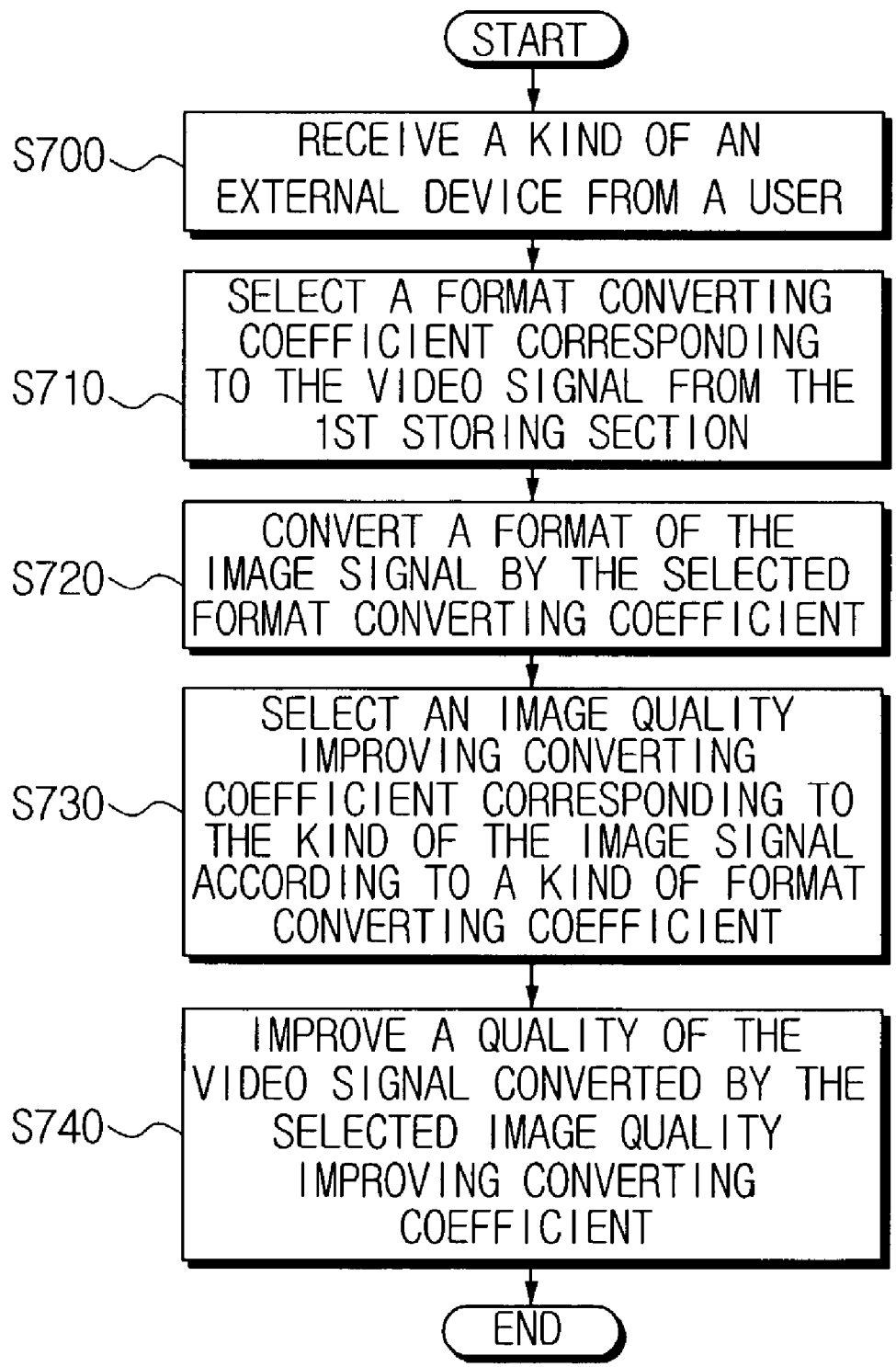
FIG. 7 is a flowchart of an image signal processing method according to another preferred embodiment of the present invention.

Referring to FIG. 6, the apparatus comprises an input section 600, a first storing section 610, a format converting section 620, a control section 630, a second storing section 640, and an image quality improving section 650. The input section 600 receives the kind of external device from a user. The first storing section 610 stores a plurality of format converting coefficients. By providing the first storing section with a storage medium such as ROM, EEPROM or the like, respective format converting coefficients are previously stored in accordance with the kind of the inputted image signal. The format converting section 620 converts a format of the image signal by use of the format converting coefficient corresponding to the kind of the image signal (for example, a TV broadcasting signal, a video signal, and a DVD signal) inputted from the external device. The control section 630 transmits to the format converting section 620 the format converting coefficient selected from the first storing section 610 in accordance with the kind of the external device, and controls the format converting section 620 to convert the format of the image signal by using the transmitted format converting coefficient. The second storing section 640 stores a plurality of image quality improving converting coefficients. The image quality improving section 650 improves the quality of the image signal by using the image quality improving converting coefficient corresponding to the image signal inputted from the external device. At that time, the control section 630 transmits to the image quality improving section 650 the image quality improving converting coefficient selected from the second storing section 640 in accordance with the kind of the external device, and controls the image quality improving section 650 to improve the image quality of the converted image signal. FIG. 7 is a flowchart of an image signal processing method according to another preferred embodiment of the present invention.

If any one of an image signal among a TV broadcasting signal, a video signal and a DVD signal is inputted from an external device, the input section 600 receives the kind of external device from a user (step S700). For example, if the video signal is inputted, the user selects the video signal among the TV broadcasting signal, the video signal and the DVD signal. If the image signal of the video signal is inputted from the external device, the control section 630 selects a format converting coefficient corresponding to the video signal from the first storing section 610 (step S710).

The format converting section 620 converts a format of the inputted video signal by the selected format converting coefficient (step S720). The control section 630 selects an image quality improving converting coefficient corresponding to the video signal from the second storing section 640 (step S730). The image quality improving section 650 improves the quality of the video signal converted by the selected image quality improving converting coefficient (step S740).

With the image signal processing apparatus and method according to the present invention, it is possible to achieve the format conversion and image quality improvement of the inputted image signal by use of the format converting coefficient and image quality improving coefficient corresponding to the kind of the image signal inputted from the external device, thereby reflecting the characteristics of the image signal in achieving the format conversion and image quality improvement of the image signal. In addition, by use of the format converting coefficient and image quality improving coefficient prepared previously for every kind of respective image signal, the converting calculation is easy, and its processing time is shortened.

Although the preferred embodiments of the present invention have been disclosed for illustrative purposes, those skilled in the art will appreciate that various modifications, additions and substitutions can be made without departing from the scope and spirit of the invention as disclosed in the accompanying claims.

What is claimed is:

1. An apparatus for processing an image signal, comprising:
    a detecting section for inputting an image signal through one of different input terminals according to a kind of an external device and detecting a kind of the input image signal by distinguishing the input terminal;
    a first storing section for storing a plurality of format converting coefficients;
    a format converting section for converting a format of the image signal by use of the format converting coefficient corresponding to the kind of the image signal;
    a control section for transmitting to the format converting section the format converting coefficient selected from the first storing section in accordance with the kind of the image signal, and controlling the format converting section to convert the format of the image signal by using the transmitted format converting coefficient;
    a second storing section for storing a plurality of image quality improving converting coefficients; and
    an image quality improving section for improving a quality of the image signal by the image quality improving converting coefficient corresponding to the kind of the image signal,
    the control section, being inputted with the image signal of converted format, for transmitting to the image quality improving section the image quality improving converting coefficient selected from the second storing section, and controlling the image quality improving section to improve the image quality of the image signal by using the transmitted image quality improving converting coefficient.

2. A method for processing an image signal, the method comprising the steps of:
    inputting an image signal through one of different input terminals according to a kind of an external device and detecting a kind of the input image signal by distinguishing the input terminal;
    selecting a format converting coefficient corresponding to the kind of the image signal;
    converting a format of the image signal by the format converting coefficient;
    selecting an image quality improving converting coefficient corresponding to the kind of the image signal; and
    improving a quality of the converted image signal by the selected image quality improving converting coefficient.

3. An apparatus for processing an image signal, the apparatus comprising:
    an input section for receiving a kind of an external device from a user;
    a first storing section for storing a plurality of format converting coefficients;
    a format converting section for converting a format of the image signal by use of the format converting coefficient corresponding to a kind of the image signal inputted through one of different input terminals according to a kind of an external device and detected by distinguishing the input terminal;
    a control section for transmitting to the format converting section the format converting coefficient selected from the first storing section in accordance with the kind of the image signal, and controlling the format converting section to convert the format of the image signal by using the transmitted format converting coefficient;
    a second storing section for storing a plurality of image quality improving converting coefficients; and
    an image quality improving section for improving a quality of the image signal by the image quality improving converting coefficient corresponding to the image signal inputted from the external device,
    the control section for transmitting to the image quality improving section the image quality improving converting coefficient selected from the second storing section in accordance with the external device, and controlling to improve the image quality of the converted image signal by using the transmitted image quality improving converting coefficient.

4. A method of processing an image signal, the method comprising the steps of:
    receiving a kind of an external device from a user;
    selecting a format converting coefficient corresponding to the kind of the image signal inputted through one of different input terminals according to a kind of an external device and detected by distinguishing the input terminal;
    converting a format of the image signal by the format converting coefficient;
    selecting an image quality improving converting coefficient corresponding to the kind of the external device; and
    improving a quality of the converted image signal by the image quality improving converting coefficient.

* * * * *